United States Patent [19]

Jenkins

[11] 4,280,226
[45] Jul. 21, 1981

[54] PROTECTIVE COVER FOR THE FACE PLATE OF A MOTORCYCLE-TYPE RADIO

[76] Inventor: Joseph E. Jenkins, 209 13th St., Pawnee, Ill. 62558

[21] Appl. No.: 945,448

[22] Filed: Sep. 25, 1978

[51] Int. Cl.³ .......................................... B62J 23/00
[52] U.S. Cl. ..................... 455/345; 70/158; 74/558.5; 174/66; 224/30 A; 339/36; 339/94 R; 455/347
[58] Field of Search ............... 455/345, 347, 349, 90; 339/125, 123, 36, 37, 38, 94 A, 119 R, 126 RS; 174/5, 66, 67; 224/42.42 R, 42.45 R, 29 R, 39, 30 R, 30 A, 31; 312/7 R, 100; 325/352, 117, 111, 115, 116, 118, 16, 17; 150/52 R; 206/316, 335; D9/260, 267; 70/158; 280/289 S, 289 R, 202; 74/558.5-553

[56] References Cited

U.S. PATENT DOCUMENTS

| D. 196,436 | 10/1963 | Ingraham et al. | 325/16 UX |
| 3,296,404 | 1/1967 | Stevens | 174/66 X |

FOREIGN PATENT DOCUMENTS 2041452 2/1972 Fed. Rep. of Germany ............. 339/36

Primary Examiner—Robert J. Spar
Assistant Examiner—Jerold M. Forsberg
Attorney, Agent, or Firm—Ralph F. Staubly

[57] ABSTRACT

An open-faced rectangular cover-box has a radio-face-spanning wall which is medially partially cut away (1) to expose the usual rectangular radio-station-selector window and (2) to receive snugly therethrough the sleeves for the station-selector shaft and for the volume-control and on-off shaft. Thus by removing the two radio knobs and the sleeve-engaging nuts which fasten the radio face-plate to the in-fairing-mounted radio, the radio face-plate can be removed. This permits the cover-box to be placed with its radio-spanning wall covering the front of the radio housing. Then the removed radio face-plate can be placed in the box and re-fastened to the radio so as to fix the open-faced box over and around the radio face-plate by clamping the partially cut-away box wall between the radio body and its replaced face-plate. The face-plate cover desirably also includes a removable rectangular open-faced closure-box which can be telescopically engaged with the permanently installed cover-box for completely covering the radio face-plate when not in use or when bad weather dictates.

4 Claims, 7 Drawing Figures

PROTECTIVE COVER FOR THE FACE PLATE OF A MOTORCYCLE-TYPE RADIO

BACKGROUND AND OBJECTS OF THE INVENTION

The usually present wind-and-weather shields on motorcycles do to some degree protect radios mounted closely behind such shields. And while it would be obvious to place a completely covering protective box or bag over the radio in bad weather or when not in use, there is a need for a protective box which would for most of the time permit normal (adjustable) use, but which would provide complete covering when needed or desired. It is the principal object of this invention to provide such a cover.

BRIEF DESCRIPTIONS OF THE DRAWINGS

DETAILED DESCRIPTION

With reference now to the drawings, the letter M generally designates the portions of a motorcycle which illustrate a typical (prior art) uncovered installation of a radio R, located below a windshield W, above and between handlebars H, and between twin loudspeakers S.

Figure 1:
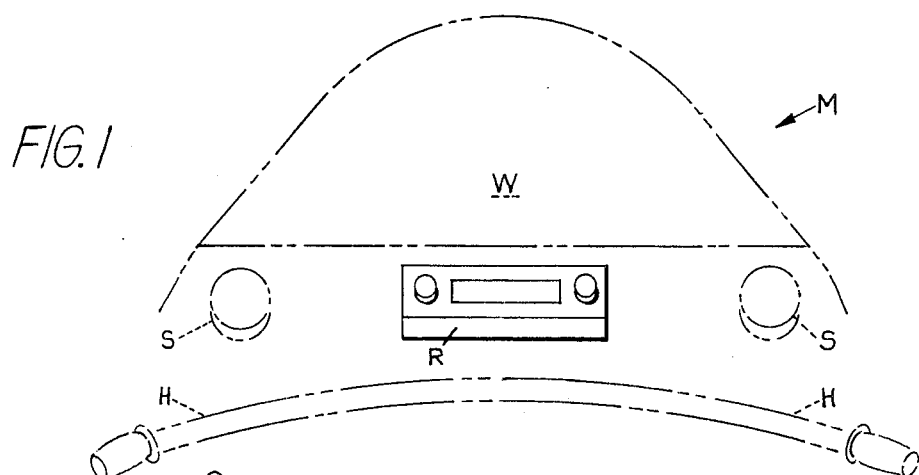
FIG. 1 is a front elevational view of a typical prior-art motorcycle-radio installation without a cover.
Figure 2:
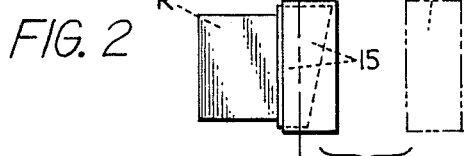
FIG. 2 is a somewhat schematic side view of a preferred embodiment of the present invention.

FIG. 2 schematically shows in side elevation the two-box cover, generally designated 11, assembled with and completely covering the face of the radio R. The removable half 13 of the cover 11 is also shown (in phantom) removed therefrom. The permanently attached half 15 of the cover 11 is shown (hidden) by dashed lines.

Figure 3:
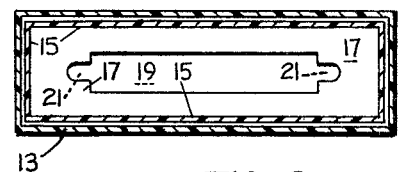
FIG. 3 is an elevational view in section taken on the line 3—3 of FIG. 2.
Figure 4:
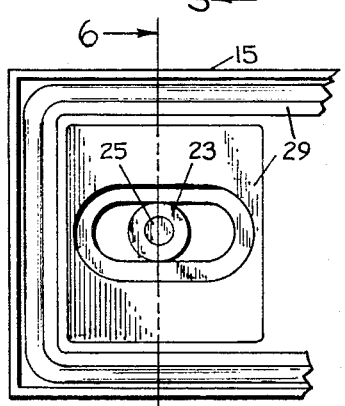
FIG. 4 is a fragmentary front elevational view of the open-faced box with the radio face-plate replaced for attaching the box.
Figure 5:
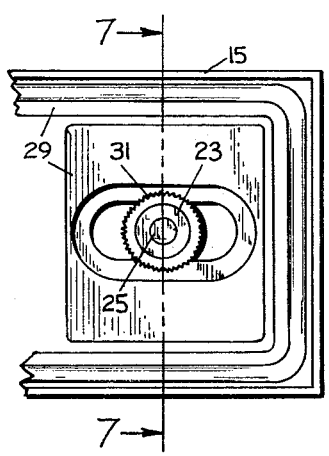
FIG. 5 is a fragmentary front elevational view of the open-faced box and the radio face-plate interconnected by a replaced nut.
Figure 6:
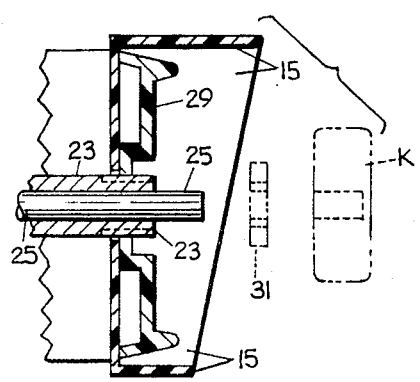
FIG. 6 is an enlarged fragmentary elevational view in section taken on the line 6—6 of FIG. 4.
Figure 7:
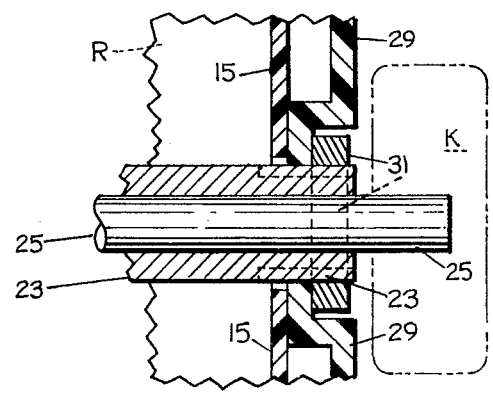
FIG. 7 is a further enlarged fragmentary elevational view in section taken on the line 7—7 of FIG. 5.

FIG. 3 shows in front elevation and in section the permanently installable half-cover or box 15, telescopically embraced by the removable half-cover or box 13. The radio-face-engaging wall 17 of the box 15 has its medial portion cut-away at 19 to expose the radio-tuning window, and at areas 21 to snugly receive the externally threaded bearing sleeves 23 for the radio-control shafts 25. The sleeves 23 snugly fit in slots in the radio face-plate 29. Nuts 31 on sleeves 23 originally clamp the radio face-plate 29 to the front of the housing of the radio R. But in FIGS. 5, 6 and 7 there is shown how the nuts 31 herein fasten the box 15 to the radio R by clamping its partially cut-away wall 17 between the radio proper and the radio face-plate 29.

The invention having been described, what is claimed is:

1. A protective cover for and combined with the face-plate of a radio mounted to face the operator of a motorcycle or a like device, said cover comprising: an open-faced horizontally elongated box rectangular in vertical and horizontal longitudinal cross-sections and having a back wall at least slightly larger than the radio face-plate protectively covered thereby, said back wall being medially partially cut-away to expose the usual station-selector window of said radio, said back wall also having apertures for relatively close-fitting reception of the usual threaded bearing-sleeves for the usual radio-control shafts, which sleeves plus the usual co-operating nuts normally clamp said radio face-plate to the front surface of said radio, said open-faced box being attached to said radio by having its back wall clamped between the front of the radio proper and its face-plate by the co-operating nuts, and a moveable closure member positionable over the open face of said open-faced box for completely covering and protecting said radio face plate.

2. A protective cover and radio-face-plate combination according to claim 1, said box being formed of plastic material.

3. A protective cover and radio-face-plate combination according to claim 1 wherein said movable closure member is a second open-faced molded-plastic box telescopically engageable with said first-mentioned box for completely covering said radio-face-plate.

4. A protective cover and radio-face-plate combination according to claim 1 in which an upper wall of said first-mentioned open-faced box is wider than a lower wall to provide a hood or an awning-like extension.

* * * * *